Sept. 2, 1969  A. BOETTCHER  3,464,888
NUCLEAR REACTOR AND METHOD OF OPERATING SAME
Filed May 25, 1967
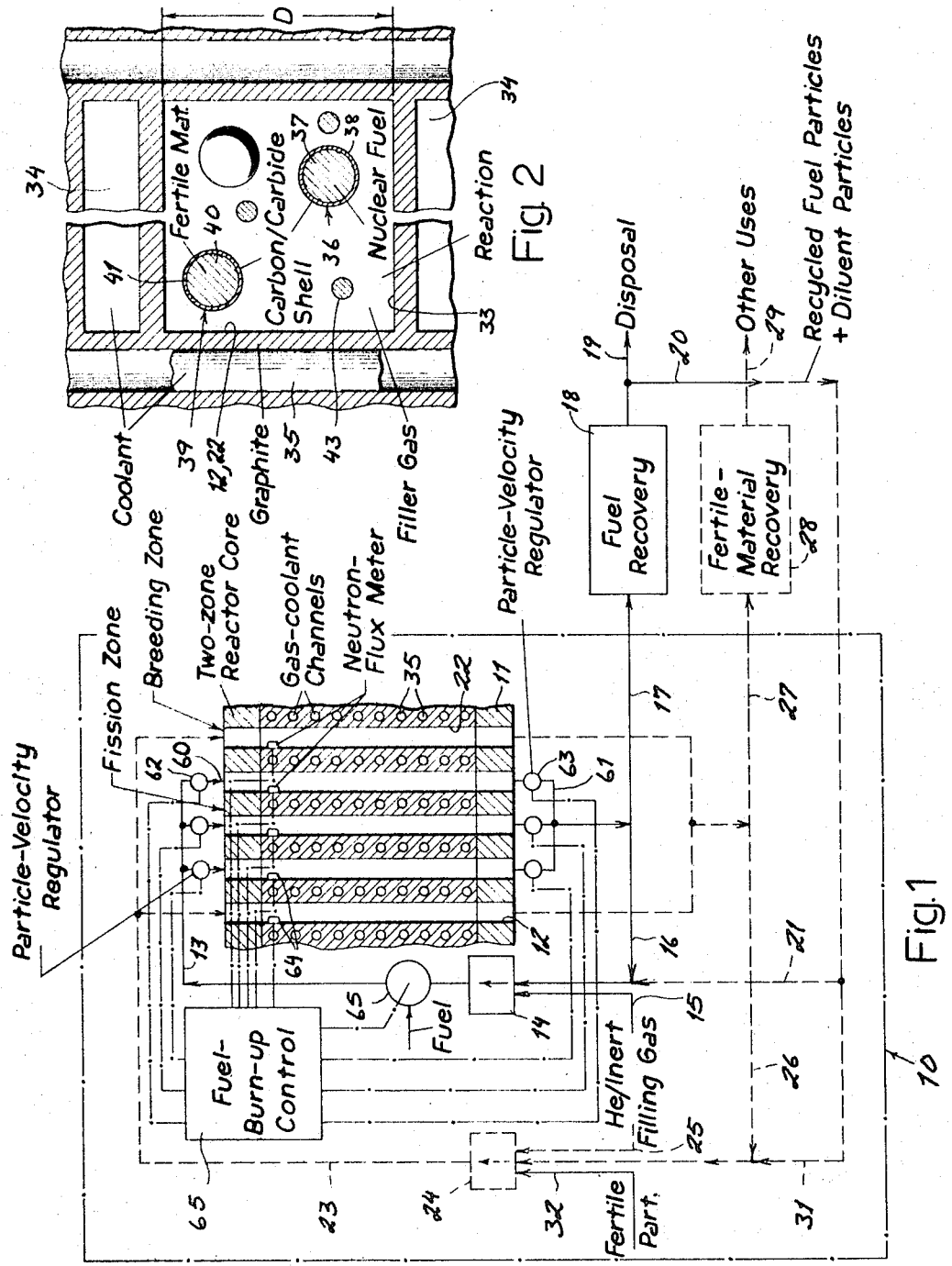
INVENTOR:
Alfred Boettcher
BY
Karl F. Ross
Attorney

United States Patent Office 3,464,888
Patented Sept. 2, 1969

3,464,888
NUCLEAR REACTOR AND METHOD OF OPERATING SAME
Alfred Boettcher, Aachen, Germany, assignor to Kernforschungsanlage des Landes Nordrhein-Westfalen-e.V., Julich, Germany, a corporation of Germany
Continuation-in-part of application Ser. No. 518,298, Jan. 3, 1966. This application May 25, 1967, Ser. No. 641,350
Claims priority, application Germany, Jan. 21, 1965, K 55,062
Int. Cl. G21c 3/26, 15/02
U.S. Cl. 176—32            6 Claims

ABSTRACT OF THE DISCLOSURE

Method of operating a heterogeneous nuclear reactor in which carbide- or carbon-coated particles (particle size=several hundred microns) of a nuclear-fuel and/or fertile substance are passed substantially continuously downwardly through vertical channels in a graphite reactor core at a rate of 2 to 20 mm./hr. and controlled by the rate of withdrawal of the particles from the base of the channels, the channels having cross-sectional dimensions substantially in excess of the dimensions of the particles, namely, 0.2 to 2 mm., a coolant being passed through ducts in the reactor core independent of the channels while helium fills the channels to serve as a heat-transfer promoter between the particles in the channels and the channel walls across which thermal transfer to the coolant is effected. The fuel particles are fed to the channels selectively in accordance with the degree of burnup.

---

This application is a continuation-in-part of my copending application Ser. No. 518,298, filed Jan. 3, 1966, and now abandoned.

My present invention relates to a method of operating a nuclear reactor and to an improved nuclear-reactor system whereby the difficulties hitherto involved in the handling of depleted fuels and for recovering enriched fertile substance and other valuable constituents of the system can be avoided.

The operation of nuclear reactors with so-called "coated" particles of a fissionable and/or fertile nuclear fuel has been described by various workers in the field and indeed it is common to provide, for nuclear reactors, particles of uranium and/or thorium oxides or carbides which are coated with thin shells of pyrolytic graphite or carbides for use in gas-cooled reactors. Thus, the graphite-sheathed fuel substance can be imbedded in a graphite reactor core or graphite bodies assembled into such a core or can be disposed in spherical or rod-shaped fuel elements. Rod-like fuel elements can, for example, be produced by loosely depositing the particles in a cylindrical shell of a thermally conductive material which may be provided with fins or other irregularities to promote heat exchange. An improved system of this type is described in my copending application Ser. No. 498,786, filed Oct. 20, 1965, now abandoned. The cooling of the fuel elements is carried out with a gaseous cooling fluid contacting the metallic shell of the fuel element from the exterior thereof. Conventional nuclear-reactor systems of this type, however, have some significant disadvantages especially as concerns the reworking of the fuel mass to recover the reusable fuel substances in an enriched state from the fission fragments and encapsulating material. Thus, one of the difficulties involved in the recovery of a nondepleted fuel or of a fertile breeder substance which has been subjected to the reactor flux is that these substances are contaminated with much larger quantities of graphite or other encapsulating material. When the particles are loosely disposed in a fuel-element shell, special manipulators must be provided for opening the pneumatically sealed shell and economic considerations require the provision of decontaminated fuel-element parts in the new fuel elements to be produced, thereby increasing the complexity of handling.

It is, therefore, an important object of the present invention to provide a method of operating a nuclear reactor using particles of a nuclear-fuel or fertile breeder substance which permits the recovery of the valuable constituents of the fuel or fertile material with a minimum of expense and difficulty.

Another object of this invention is to provide an improved nuclear-reactor system and method of operating same which will avoid the need for manipulating devices or the like for removing the valuable material from the usual fuel-element cans or the like.

These objects and others which will become apparent hereinafter are attained, in accordance with the present invention (as originally described in said application Ser. No. 518,298), by a method of operating a nuclear reactor whereby the fissionable fuel is constituted in encapsulated form in a sheath of carbon or carbides and contains uranium carbide or oxides and is of a specific particle size, namely, between 0.2 and 2 mm. (particle diameter) and preferably between 0.3 and 0.7 mm., the nuclear-fuel particles being passed continuously and slowly through respective channels of the nuclear-reactor core, generally at a rate of 2 to 22 mm./hour. According to a specific feature of this invention, the nuclear-fuel and/or fertile-substance particles are carried slowly through channels whose outer surface area is relatively large in order to obtain an effective heat transfer between the channel and the cooling medium. The latter is preferably a gas which is prevented from contacting the nuclear fuel or fertile particles directly. Helium and/or mixtures of other inert gases need not, therefore, be used as a cooling medium but can be provided as a filling fluid for the plenum chambers constituted by the channels through which the nuclear-fuel particles and the fertile particles pass. This gas serves as a heat-conductive medium to facilitate an efficient heat exchange between the surfaces of the fuel particles and the surrounding surface of the channel walls. It will be apparent that, where (as in conventional systems) the interfacial contact between a fuel element (e.g. a canister) and the walls of a reactor core or a moderator liquid is proportionately large, there will be no need for a heat-conductive filler gas at this interface. However, coated particles of the type used in the system of the present invention are, as a practical matter, insulators with respect to conductivity of heat even though they may become very hot in the course of the nuclear reaction. When the particles, as here set forth, are relatively small by comparison with the cross-section of channels, the likelihood is that most of the particles will be separated from a wall of the channel by a layer of other relatively nonconductive particles. This is one of the key problems in operating a heterogeneous reactor with a pulverulent fuel and arises especially when a low velocity of the fuel is sustained. It is, therefore, the "filling" gas which is cooled by the passage of a coolant through the ducts independent of the fuel-particle channels. It is thus important to distinguish the "filler gas" from the coolant in spite of the fact that the filler constitutes an intermediate cooling medium. The rate of passage of the particles through the channels is controlled by regulating the rate at which they are drawn from the bottoms of the channels.

The channel preferably extend vertically and the particles are circulated or returned by pneumatic or mechanical means for passage through another, similar channel or the same channel. When the nuclear fuel is depleted or the fertile particles have been subjected to a neutron flux sufficient to cause enrichment of fissionable material to the desired level, the particles are conveyed from the reactor core and can be subjected to recovery operations without the need for handling of fuel rods or fuel cartridges. The particles may be displaced in a gas stream, as more fully disclosed hereafter, or use may be made of any of the systems conventional for such purposes in the art. Typical among them are the systems described in chapter 10, pages 55 ff. of Marks' Mechanical Engineers Handbook, Theodor Baumeister, McGraw-Hill, New York, 1958, and at chapter 7, pages 2 ff. of Perry's Chemical Engineers Handbook, McGraw-Hill, New York, 1963. This method of recovery is especially simple because the volume or weight ratio of the fuel to the encapsulating carbon or carbide is large by comparison to earlier systems using fuel rods or elements. A further advantage resides in the fact that the conveying means for removing the particles from the nuclear reactor can be coupled directly with the recovery system to lower storage, transportation and handling costs and reduce the danger to operating personnel. Moreover, the fraction of the fuel withdrawn from the cycle and outside the reactor core is proportionately small, thereby reducing, in reactors having a conversion rate above unity, the time required for duplicating the amount of fissionable material present.

It will be understood that this system has significant advantages by comparison with earlier systems wherein, for example, the coolant gases were passed directly through the ducts in which the fissionable material was disposed. In systems of the latter type, fission fragments and other radioactive products of the nuclear reaction, especially inert gases and low, melting-point elements such as barium and cesium, pass through the walls surrounding the fuel into the coolant stream and contaminate the coolant, thereby making it necessary to provide extensive and complex equipment and to decontaminate the coolant gas. The obvious disadvantage with respect to the operating personnel need not be discussed in detail here. Furthermore, the conventional system requires that the fuel elements remain in place for a relatively prolonged period even when a two-zone reactor is involved. In such a reactor, when it was desired to obtain a conversion rate in excess of unity, the inner reactor core was provided with the fissionable fuel while the breeder systems were concentrated in the outer zones. The central location of the nuclear fuel elements cause their rapid depletion for a relatively small amount of transformation of the fertile substances and requires early replacement of the fuel rods, recovery of valuable substances from the depleted rods and the costly manufacture of new fuel elements. All of these disadvantages are avoided by the method and reactor of the present invention.

According to a more specific feature of this invention, the nuclear-fuel particles encased in the carbide or carbon shells can be passed through the central or inner zone of a two-zone reactor core while the fertile particles, similarly encased in carbon or carbide shells, are passed through the channels of the outer zone. It has been found, moreover, that excellent results are obtained when the fertile particles are mixed with the fissionable-fuel particles as will become apparent hereinafter. The particles are, as indicated, encased in substances with a minimum cross-section for absorption of neutrons, e.g. carbon and the carbides mentioned in my copending application Ser. No. 498,786, filed Oct. 20, 1965, the encapsulated layers being as thin as possible. Best results are obtained when the particles are generally spherical. As set forth in the aforementioned copending application, in order to ensure a homogeneous neutron flux and irradiation of the breeder particles and to vary the flux density, it is advantageous to "dilute" or disperse the particles of nuclear fuel or fertile material in a filling medium of pyrolytic carbon or carbon-black particles. The ratio of fuel-containing particles to carbon particles can range from 0.3:1 to about 5:1. The reaction is preferably carried out in a nuclear reactor whose channels for the encapsulated particles are constituted of graphite and are rectangular at least in the nuclear-fission zone so that the heat-conductivity paths are relatively short. The smallest dimensions of these channels are, however, sufficiently large to permit an undisturbed flow of the particles through the channel and should be not less than four times the diameter of the particles passing therethrough. The partially utilized fuel is fed to the channels selectively in accordance with its degree of "burnout."

The above and other objects, features and advantages of the present invention will become more readily apparent from the following description, reference being made to the accompanying drawing in which:

FIG. 1 is a diagrammatic view of a nuclear reactor and auxiliary apparatus according to the invention; and FIG. 2 is a fragmentary cross-sectional view through a typical channel of the reactor core.

In FIG. 1, I diagrammatically show a nuclear reactor 10 whose core 11 is formed with an inner or fission-reaction zone and an outer or neutron-induced-breeding-reaction zone. The vertical channels 12 of the fission-reaction zone are connected to the duct means 13 of a system for recycling carbon or carbide-coated particles of a fissionable fuel (e.g. $U^{235}$ oxide) in a medium of helium-containing inert gas and preferably a diluent of carbon-black particles. The circulating means is represented by a pneumatic pump 14 which is supplied with helium or a mixture of helium with other inert filling gases via a line 15 and with the nuclear-fuel particles via a line 16. In general, the nuclear-fuel particles, which are encased in carbon or carbide as described in my copending application mentioned above, are recycled until the conversion efficiency drops whereupon the fuel particles are led off at 17 from the reactor 10 and subjected to fuel recovery at 18 in the usual manner. There is, however, no need to open canisters for the fuel particles inasmuch as these particles pass directly through the channels 12. Waste products are disposed of at 19 while, as represented by line 20, recovered and reusable fuel converted again into coated particles, is returned to the recycling means 14 as indicated at 20 and 21. The breeding channels 22, however, receive a continuous and slow-moving charge of nuclear-fuel particles and fertile or breeder particles (e.g. $Th^{232}$ or $U^{238}$ oxide or carbide) with an inert helium-containing filling-gas mixture and diluent particles of carbon or carbon black. For true breeder operation, the nuclear, fuel used in the fission-reaction zone 12 may of course be replaced by the plutonium or thorium fuels resulting from the irradiation of the fertile substances in the breeder channels ($U^{238}$–$Pu^{239}$ and $Th^{232}$–$U^{233}$). The fertile particles are supplied to the circulating means 24 and thence conducted to the channels 22 by a line 23, the particles withdrawn from the channels 22 being returned to the circulating means via a line 26. Additional nuclear fuel may be supplied from the fuel-recovery station 18 or the breeder-material-recovery station 28 via a line 31. The neutron-irradiated fertile particles are conducted to the recovery station 28 as represented by a line 27 and a portion of the transmuted fertile material is returned as fresh nuclear fuel to the reactor while the remainder can be used for other purposes (line 29). Breeder particles are supplied to the recirculating means 24 as represented at 32 while an inert helium-containing filling gas is supplied at 25.

Referring now to FIG. 2, it will be seen that at least the channels 12 and preferably also the channels 22 are formed with a rectangular cross-section and have graphite walls 33 disposed between the interior of the channels and the wall, ducts 34 and 35 flanking each channel 12, 22. The ducts 34 are vertically extending gas passages for the cooling medium whereas the channels 35 are horizontally extending bores or tubes likewise supplied with the gaseous coolant which, therefore, does not enter the channels 12, 22 or contact the particles directly. The nuclear-reactor fuel particles 36 are constituted as small spheres with a diameter between 0.2 and 2 mm. and preferably between 0.3 and 0.7 mm. and include a kernel 37 of uranium or thorium oxide or carbide encased in a thin shell 38 of carbon or of a carbide as described in the aforementioned copending applications; similarly, the breeder particles 39 include cores 40 of a fertile metal oxide or carbide encased in a shell 41 of carbon or a carbide. A filler gas is received within the channel 12, 22 whose smallest dimension D is at least four times the diameter of the particles 36, 39 to permit free movement of the particles within the channel. Beaded carbon black 43 serves as a diluent for the fuel and fertile particles.

In the fuel-supply line 60 and in the fuel-outlet line 61 of each channel 12, I provide control valves or regulators 62 and 63, respectively, which establish the rate of travel of the particles through the channels and thus the duration of dwell of each fuel particle therein. Since the channels are of known geometry and dimension, the fuel-burnup rate is determinable by measuring the neutron flux density in the reactor and such measurement can be carried out by conventional means. Purely for illustrative purposes, I have shown a plurality of control-flux meters 64 in both the fuel and breeding zones, these flux meters being coupled with a fuel-burnup control 65 constituting a mechanism which regulates, on the one hand, the rate (in units of mass per unit of time) or flow of the fuel particles through these channels in accordance with the flux density and the supply of fuel to line 13 at 66 so that the fuel particles have essentially the same degree of burnup from all channels. Thus, it is clear that the burnup velocity in the different channels 12 is determined by the developed neutral flux and, since all other variables are eliminated in a reactor of predetermined size and geometry, the mass rate of flow of the fuel particles is substantially the sole determinant of the degree of burnup of the emerging particles. By the control of the fuel supplied at 65 or the diluent carbon-black particles recycled at 20 and 21, or by regulating the rate in which the particles pass through the channels, the neutron flux in the channels and the burnup state at the end of the pass can be both established at will and made uniform. The same burnup condition of the particles leaving the channels can be established, on an average, even where the particles are recycled partially depleted fuel particles in some channels and fresh fuel particles in others.

The invention described and illustrated is believed to admit of many modifications within the ability of persons skilled in the art, all such modifications being considered within the spirit and scope of my invention except as otherwise limited by the appended claims.

I claim:

1. In a method of operating a heterogeneous nuclear reactor containing a fissionable fuel at least in part in the form of a fuel substance, the improvement which comprises the steps of passing particles of said substance, encased in carbon or a carbide and having particle diameters between 0.2 and 2 mm. substantially continuously through channels in said reactor having cross-sectional dimensions in excess of said diameters; cooling said channels by passing a cooling fluid through ducts in said reactor in heat-exchanging relationship with and independently of said channels; filling said channels and interstitial spaces between said particles with a gas inert to said particles and independent of said fluid for effecting heat transfer between said particles and the walls of said channels, said channels being disposed at locations sustaining varying neutron fluxures; and selectively passing said fuel particles through said channels at respective rates adapted to obtain substantially the same degree of burnup of the fuel particles emerging from all of said channels.

2. The improvement defined in claim 1 wherein said gas contains helium.

3. The improvement defined in claim 1, further comprising the step of admixing with said particles a diluent particle of a material having a low neutron-absorption cross-section and selected from the group consisting of pyrolytic carbon, graphite and carbon black, said particles of said substance having a diameter ranging between substantially 0.3 and 0.7 mm.

4. In a method of operating a heterogeneous nuclear reactor containing a fissionable fuel at least in part in the form of a fuel substance, the improvement which comprises the steps of slowly passing a continuous column of particles of said substance, encased in carbon or a carbide and having particle diameters between 0.2 and 2 mm., substantially continuously and in constant contact with one another through channels in said reactor having cross-sectional dimensions in excess of said diameters; cooling said channels by passing a cooling fluid through ducts in said reactor in heat-exchanging relationship with and independently of said channels; and filling said channels and interstitial spaces between said particles with a gas inert to said particles and independent of said fluid for effecting heat transfer between said particles and the walls of said channels.

5. The improvement defined in claim 4 wherein said gas contains helium.

6. The improvement defined in claim 4, further comprising the step of admixing with said patricles a diluent particle of a material having a low neutron-absorption cross-section and selected from the group consisting of pyrolytic carbon, graphite and carbon black, said particles of said substance having a diameter ranging between substantially 0.3 and 0.7 mm.

References Cited

UNITED STATES PATENTS

| 3,039,948 | 6/1962 | Krucoff | 176—45 |
| 3,050,454 | 8/1962 | Barr et al. | 176—51 |
| 3,350,272 | 10/1967 | Seltorp | 176—45 |
| 3,058,897 | 10/1962 | Slack et al. | 176—45 |
| 3,142,625 | 7/1964 | Wellborn | 176—32 |
| 3,151,037 | 9/1964 | Johnson et al. | 176—91 |
| 3,284,309 | 11/1966 | Murphree | 176—45 |

FOREIGN PATENTS

| 792,114 | 3/1958 | Great Britain. |
| 839,392 | 6/1960 | Great Britain. |

BENJAMIN R. PADGETT, Primary Examiner

H. E. BEHREND, Assistant Examiner

U.S. Cl. X.R.

176—18, 51, 59